Patented Nov. 22, 1932

1,888,903

UNITED STATES PATENT OFFICE

ERNST BODMER AND FRANZ NEITZEL, OF BASEL, SWITZERLAND, ASSIGNORS TO THE FIRM OF DURAND & HUGUENIN S. A., OF BASEL, SWITZERLAND

MANUFACTURE OF MORDANT AZO DYESTUFFS

No Drawing. Application filed February 20, 1930, Serial No. 430,128, and in Germany March 1, 1929.

The production of azo compounds by oxidation of aromatic amino compounds, under concomitant union of two molecules thereof, has attained very little importance in practice.

In many cases the yield of this reaction is quite insufficient (see Berliner Berichte 38, page 1238).

In other cases where the yield is satisfactory, bodies of no practical interest have been obtained (see for example Berliner Berichte 33, page 2714).

The oxidation of dehydrothioparatoluidinesulphonic acid to chloramine yellow (see Colour Index No. 814) according to the German Patent No. 65,402, would be one of the few examples where this reaction has been applied in practice.

It has been found, that amino azo bodies of the general formula $$R_1-N=N-R_2-NH_2$$

($R_1$ standing for a benzene nucleus, bearing the substituents necessary for a mordant colour, such as for instance OH and COOH in ortho-position to each other, $R_2$ standing for a benzene nucleus, containing an amino group in para-position to the azo group, said nuclei being eventually further substituted, for instance by $SO_3H$-, COOH-, $CH_3$- groups), can easily be transformed by a suitable oxidizing action into new bodies of completely different properties.

Probably the new dyestuffs result from the original starting material in this way that two molecules of the latter are linked together by the nitrogen atoms of the amino groups and that thereby a new azo group is formed, so that the new bodies are trisazo compounds, which correspond to the following general formula:

$$R_1-N=N-R_2-N=N-R_2-N=N-R_1$$

This supposition is based on the fact that in some cases it has been possible, to obtain the same dyestuff by way of the ordinary azo coupling.

It has further been found that this process can also be applied to amino azo bodies which contain more than one azo group and which, therefore, correspond to the general formula:

$$R_1.N=N.R_2.N=N.R_3.N=N\ldots\ldots R_n.NH_2$$

where the nuclei $R_1$ and $R_n$ possess the above stated characteristics and the intermediate nuclei $R_2$, $R_3$ etc. in the link series are connected with each other by azo groups, and which, besides, can contain further substituents, preferably COOH- or $SO_3H$- groups.

Thus there are obtained polyazo dyestuffs containing an odd number of azo groups.

The process yields good results, particularly if the oxidation is carried out in an alkaline medium. Among the oxidizing agents which are effective under alkaline conditions, calcium hypochlorite (bleaching powder) seems to be particularly suitable. The process is, however, not limited to this oxidizing agent.

As said before, there are known in literature examples of this reaction, that is to say of the oxidation of two amino groups of two molecules, to form a new azo group. But this reaction is by no means a general one and the applicability thereof for the special starting material used in the present process or its smooth and easy course, allowing the use in bulk, could not be concluded from the facts known so far.

The new products which are obtained are valuable mordant dyestuffs.

The following examples illustrate the present invention, the parts being by weight.

Example 1

257 parts of the amino azo dyestuff: 4-amino-benzeneazo-salicylic acid (obtained by combining diazotized p-nitraniline with salicylic acid and reducing the nitro group, or by combining diazotized p-aminoacetanilide with salicylic acid and saponifying the acetyl group) are dissolved in about 2000 parts of hot water and the necessary quantity of alkali. After cooling down, 680 parts of caustic soda lye of 30% are added in excess and, while stirring, 1000 parts of a solution of calcium hypochlorite (bleaching powder), containing 7.1% of active chlorine, are slowly added at ordinary temperature through a dripping funnel.

The solution of the parent material in concentrated sulphuric acid is yellow. This coloration, while the reaction is progressing, turns gradually from green to blue.

At the same time the dyestuff completely precipitates. There is stirred for some time yet, then filtered. The precipitate, a lime salt, is treated with diluted hydrochloric acid on the hot water bath in order to produce the free dyestuff acid. Then the product is separated by filtration and washed. The product thus obtained is, in the form of a sodium salt, very difficultly soluble in water. It is best sulphonated with 10 parts of oleum of 20% at 100-110° C. In the form of this sulphonic acid, the dyestuff gives on chromium mordanted fibres fast, brownish-yellow tints.

*Example 2*

101.1 parts of the amino azo dyestuff: 4-amino-2-sulphobenzeneazosalicylic acid (obtained by combining diazotized p-nitraniline-o-sulphonic acid with salicylic acid and reducing the nitro group, or by combining diazotized acetylparaphenylenediamine-sulphonic acid with salicylic acid and saponification of the acetyl group) are dissolved in 1000 parts of water and 200 parts of caustic soda lye of 30%. At the temperature of about 10° C., 300 parts of a solution of calcium hypochlorite containing 7.1% of active chlorine, are added drop by drop, during 1½ hours, while stirring well. The solution which at first is yellow, slowly becomes brown and separates a precipitate. The solution of the parent material in concentrated sulphuric acid is yellow. This coloration, while the reaction is progressing, gradually turns over green to blue. As soon as all the dyestuff is precipitated, and as soon as its solution in concentrated sulphuric acid is of a pure blue, the reaction is achieved.

The precipitate, a lime salt, is filtered off and pressed. It is treated with diluted hydrochloric acid on the hot water bath, filtered off again and washed. Finally it is dissolved hot in diluted sodium solution, and the solution is filtered. When cooling down, the dyestuff precipitates in form of crystals. The part which remains in the solution can easily be separated by addition of some common salt.

The solution in concentrated sulphuric acid of the new dyestuff is of pure blue coloration. When diluting this solution with water the dyestuff separates out in form of brown flakes. In water, the product dissolves in form of a sodium salt with yellowish brown coloration which turns to violet if soda lye is added in excess.

The new dyestuff gives, on chrome mordanted fibres fast brown shades.

This dyestuff may be further sulphonated so as to be better soluble in water. The shade of the thus obtained dyestuff, compared with the one not further sulphonated, is more yellowish.

In this example, the calciumhypochlorite can be replaced by other oxidizing agents, such as for instance potassium permanganate. Calciumhypochlorite seems, however, to be particularly suitable because with this oxidizing agent the new dyestuff, as its formation takes place, gradually separates out in the form of a lime salt and is therefore protected from any too-far-going effect of the oxidizing agent.

In place of 4-amino-2-sulphobenzeneazosalicylic acid, isomeric and homologous products of this body can be used with similar results, for instance: 4-amino-3-sulphobenzeneazosalicylic acid, 4-amino-2-sulphobenzeazo-ortho-cresotinic acid, 4-amino-2-sulphobenbeneazometacresotinic acid and 4-amino-2-sulphobenzeneazo - para - cresotinic acid.

Also such bodies which, in place of a sulpho group, contain a carboxylic group, can be used.

*Example 3*

The amino azo dyestuff corresponding to the following formula:

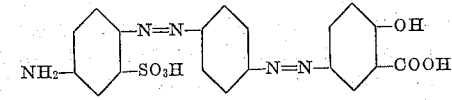

(obtained from diazotized p-nitraniline-o-sulphonic acid and aniline-N-methyl-ω-sulphonic acid by replacing the $CH_2$-$SO_3H$- group by hydrogen in the monoazo body formed, diazotizing the thus formed free amino group and coupling with salicylic acid, and finally reducing the nitro group), dissolved in form of an alkali salt, is mixed with sodium hydroxide in excess and oxidized at ordinary temperature with a solution of calciumhypochlorite. The resulting dyestuff dissolves in concentrated sulphuric acid with a steel-blue coloration, whereas the starting material dissolves therein with a violet coloration. It gives on chromium mordanted fibres brown shades.

A similar product is obtained if an amino disazo compound is used, which results when, in place of the aniline-N-methyl-ω-sulphonic acid as used before, the N-methyl-ω-sulphonic acid of metanilic acid has been employed and which, therefore, contains a further sulpho group in the middle nucleus.

The process can also be applied to amino polyazo dyestuffs which comprise more than two azo groups and which correspond to the definition given in the introduction of this specification.

Obviously, the dyestuffs obtained according to the present process can also be used in form of soluble chromium or copper compounds.

What we claim is:—

1. The herein described process for the manufacture of new mordant azo dyestuffs, which consists in using as starting material an amino azo compound of the following general formula:

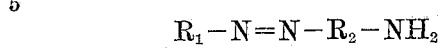

($R_1$ standing for a benzene nucleus containing as substituents a hydroxy and a carboxylic group in ortho-position to each other, $R_2$ standing for a benzene nucleus bearing an amino group in para-position to the azo group) and subjecting such body to an oxidizing action in an alkaline medium, to form by union of two molecules of the starting material probably a trisazo body of the following general formula:

$$R_1-N=N-R_2-N=N-R_2-N=N-R_1.$$

2. The herein described process for the manufacture of new mordant azo dyestuffs, which consists in using as starting material an amino azo compound of the following general formula:

($R_1$ standing for a benzene nucleus, containing as substituents a hydroxy and a carboxylic group in ortho-position to each other, $R_2$ standing for a benzene nucleus, bearing an amino group in para-position to the azo group) and subjecting such body to an oxidizing action by means of calciumhypochlorite in an alkaline medium, to form by union of two molecules of the starting material probably a trisazo body of the following general formula:

$$R_1-N=N-R_2-N=N-R_2-N=N-R_1.$$

3. The herein described process for the manufacture of new mordant azo dyestuffs, which consists in using as starting material an amino azo compound, comprising a benzene nucleus containing an amino group in para-position to the azo group and a salicylic acid compound, this body corresponding to the following formula:

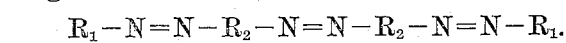

and subjecting such body to an oxidizing action in an alkaline medium, to form by union of two molecules of the starting material probably a trisazo body of the following formula:

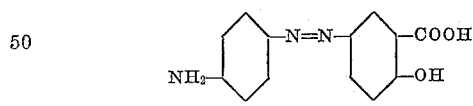

4. The herein described process for the manufacture of new mordant azo dyestuffs, which consists in using as starting material an amino azo compound, comprising a benzene nucleus containing an amino group in para-position to the azo group and a salicylic acid compound, this body corresponding to the following formula:

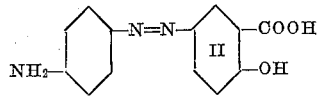

wherein the nuclei I and II besides their substituents, indicated in the formula, may be further substituted by sulpho-, carboxylic- or methyl-groups, and subjecting such body to an oxidizing action in an alkaline medium, to form by union of two molecules of the starting material probably a trisazo body.

5. The herein described process for the manufacture of new mordant azo dyestuffs, which consists in using as starting material 4-amino-2-sulpho-benzene-azo-salicylic acid, which corresponds to the following formula:

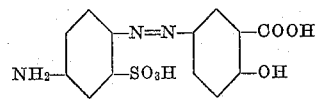

and subjecting this body to an oxidizing action by means of calcium hypochlorite, in an alkaline medium, to form by union of two molecules of the starting material probably a trisazo body of the following formula:

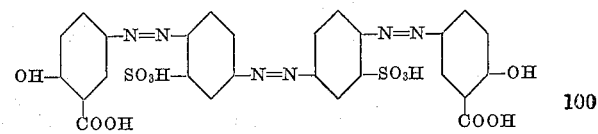

In witness whereof we have hereunto signed our names this 10th day of February 1930.

ERNST BODMER.
FRANZ NEITZEL.